Oct. 23, 1945.   C. A. REIMSCHISSEL ET AL   2,387,294
THREAD CUTTING MECHANISM
Filed Dec. 20, 1943   5 Sheets-Sheet 2

INVENTOR.
Charles A. Reimschissel
Harry Davies
BY Strauch & Hoffman
ATTORNEYS

Patented Oct. 23, 1945

2,387,294

UNITED STATES PATENT OFFICE 2,387,294

THREAD-CUTTING MECHANISM

Charles A. Reimschissel and Harry Davies, Waynesboro, Pa., assignors to Landis Machine Company, Waynesboro, Pa., a corporation of Pennsylvania Application December 20, 1943, Serial No. 514,918

28 Claims. (Cl. 10—120.5)

The present invention relates to thread cutting mechanisms, more particularly die heads for cutting threads on comparatively large diameter work, such as oil well supplies, although it is not limited to such use, as certain features thereof are applicable to other types of threading mechanisms.

Especially among the manufacturers of oil well supplies and related products there is a considerable volume of work which requires the rapid and economical forming of very precise, generally tapered, threads on relatively large diameter pipe fittings and the like. Heretofore, such threading has most often been done as a separate operation on a special machine tool, such as is disclosed in Patent 2,017,764, issued October 15, 1935, to S. W. Mathias. For tubing and other related cylindrical stock, such a machine is most efficient and economical; however, it does not adapt itself to work which requires successive metal forming operations, such as are normally performed on a turret lathe. Since it usually is disadvantageous to transfer the work to a special machine merely to thread it, the operators sometimes resort to a single point threading tool mounted in one of the stations of the turret lathe. However, the required repeated passages of such a tool over the work to generate the desired thread depth is extremely wasteful of the time of an expensive machine. To correct that condition, and to provide further advantageous features, my present die head has been designed to incorporate all the advantages of the one disclosed in the aforementioned Mathias patent and yet is compact enough to be mounted on a turret lathe for the production of threads of the types inherent to oil well supplies.

The difficulties of designing a die head capable of threading to American Petroleum Institute standards are well known in this art. To provide such a head which would produce threads whose diameter ranges even above the 6¾" standard, and yet be compact enough to be mounted on one of the stations of a turret and to clear the work and the frame of the turret lathe during indexing of the turret from one work forming stage to another, has been an almost insurmountable problem. Thread cutting machines constructed in accordance with the present disclosure are at present successfully producing threads within these limitations, and the novelty thereof resides largely in the arrangement which permits the incorporation of the best features of the machine shown in the aforementioned Mathias patent in a more compact device; however, the present disclosure is not limited thereto, since it embodies several refinements which have proven to be most advantageous and applicable to other types of existing die heads, whose structure precludes their use in a limited space.

Accordingly, the primary object of my invention is to provide a novel thread cutting device which is capable of rapidly and economically threading the larger sizes of A. P. I. threads, and yet which is so constructed that it can be successfully used on a turret lathe. This we accomplish primarily:

(1) By locating the chaser slides at the front of the head, so as to extend a minimum distance from their points of support, which materially lessens the bending moment for large work and makes for a more rigid structure, and at the same time provides one in which the chaser slides may be readily changed without dismantling the head.

(2) By mounting the chaser slides at the front of the head and controlling their movement by a cam plate incorporated in the head behind the chasers, which simplifies the construction materially, makes the chasers and chaser slides readily accessible from the front of the machine, makes it possible to give the chasers a sufficiently great range of movement to thread extra large-diametered work with a small head diameter, and also decreases the thickness or axial length of the head.

(3) By providing the chaser slides with trunnions carrying eccentrically mounted rollers projecting into the slots of a cam ring located behind the chaser assemblies, and devices at the front of the slides for holding the trunnions in adjusted angular positions, which makes it possible to individually adjust the chasers from the front of the machine without dismantling any parts thereof.

(4) By providing an extremely compact cam ring actuating device, embodying a sine bar disposed directly over the rack bars, and locating the device at the top of the head, closely adjacent thereto, which conserves space materially and brings close to the head axis all the auxiliary parts of the die head.

(5) By mounting the die head for limited sliding movement on a supporting plate transversely of the head axis, and providing screw assemblies for positively displacing the head by controlled amounts and for locking the parts in adjusted position, which makes it possible to accurately adjust the die head to compensate for any misalignment of the parts.

(6) By providing chaser guiding grooves in the front of the head, and gib plates between the grooves in overhanging relationship thereto, which provides an assembly rigidly supporting the chasers; eliminates the costly tongue and groove connection heretofore used; and also makes it possible to take up any excessive clearances developing between the chaser slides and their guides incident to normal wear of the parts.

(7) By locating the sine bar pivot directly in alignment with the axis of the pivotal and slidable connection of the rack bar to the sine bar when the parts are disposed in thread cutting position, which makes it possible to rock the sine bar into various inclinations, to produce threads of varying degrees of taper, without disturbing the diametrical setting of the head.

(8) By providing improvements in the construction of, and the mounting for, a sine bar assembly for actuating the cam ring; the mechanism employed to retract the sine bar at the conclusion of the threading operation; and the lever assembly for opening the die head independently of the action of the cam ring actuating device; and by providing a chaser slide lubricating system which materially reduces wear between the slides and their guideways.

Further objects will become apparent as the specification proceeds in conjunction with the annexed drawings, and from the appended claims.

In the drawings,

Figure 6 is a fragmental sectional view taken on the line 6—6 of Figure 1;

Figures 1, 2:
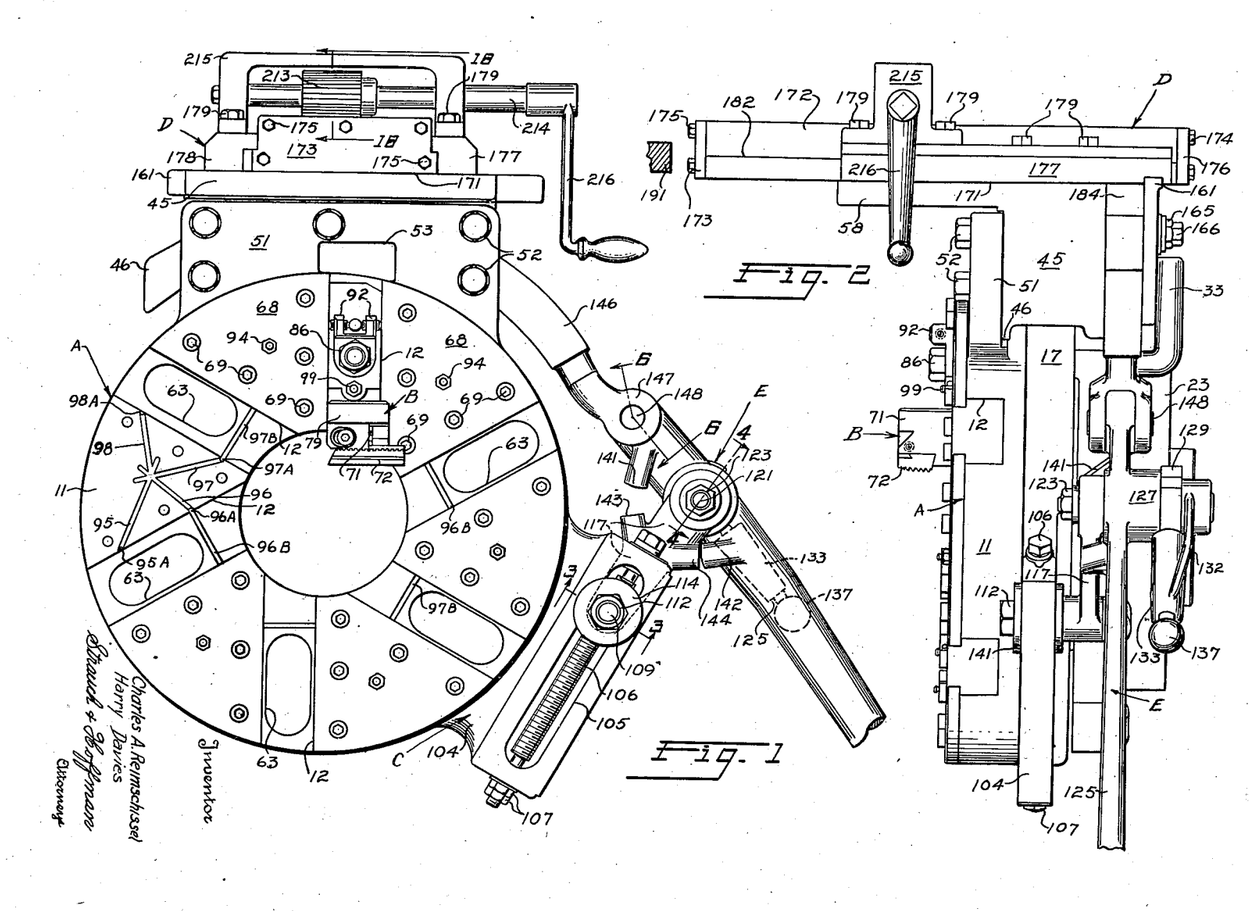
Figure 1 is a front elevational view of a die head embodying the invention, with the parts in threading position.
Figure 2 is a side elevation of the structure shown in Figure 1, as it appears when viewed from the right-hand side of that figure.

With continued reference to the drawings, in which like reference characters have been employed to designate similar parts throughout the several views, and referring first to Figures 1 and 2, the apparatus comprises a head A, carrying a series of tangential chaser holders B and it is adapted to be mounted on the machine turret. The chasers are adapted to be actuated by a cam plate or ring C and the latter is actuated in turn by a receding mechanism D located at the top of the head, so that as threading operation proceeds the chasers are moved outwardly so as to generate a tapered thread. The head may be tripped manually at any desired point in the threading operation by means of a mechanism designated generally as E, and the latter also embodies means for a rough and finish cut adjustment, so that the work may be passed through the machine twice and the thread generated in two steps.

The device will now be described in detail, the various units being described separately to simplify the disclosure.

Head structure

We have found that by supporting the head upon a special turret mounting plate, and mounting it for adjustment transversely to the axis, it is possible to readily bring the head into accurate alignment with the work, and also, by forming the head of a novel assembly of parts, space is conserved, so as to render practicable the utilization of the head in turret machines.

Referring more particularly to Figures 1, 2, 7, 8 and 9, the head comprises a front plate or member 11 having a plurality of outwardly directed holder guideways 12 and a rearwardly directed flange or hub 13. A rear plate 14 is secured to the hub of the front plate by a plurality of cap screws 15 and is provided with a narrow piloting face 16. Mounted for limiting rocking movement about the axis of the head is a cam ring 17 having inwardly facing surfaces 18 and 19 cooperating respectively with the hub of the front plate and pilot surface 16 of the back plate. The opposed faces of the front and rear plates are spaced apart sufficiently to provide a snug sliding fit with the cam ring, to permit it to freely reciprocate and yet is confined for accurate rocking movement in a plane normal to the head axis. The cam ring cooperates with the chasers, as will be hereinafter pointed out.

Figure 7:
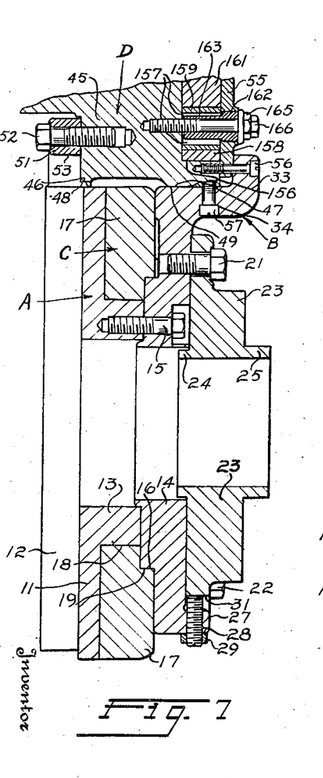
Figure 7 is a vertical sectional view through the apparatus of Figure 8, taken substantially on the line 7—7 of that figure, as it appears when viewed in direction of the arrows, and with the chaser and holder assemblies and the gib plates removed.
Figure 8:
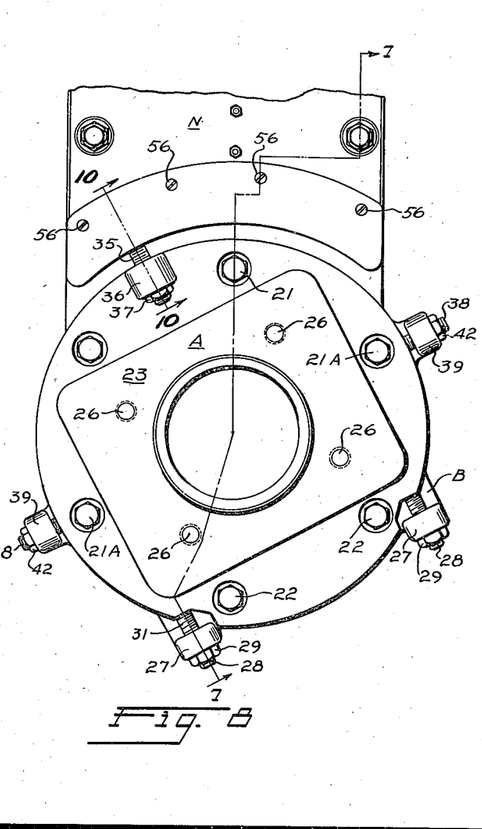
Figure 8 is a rear view of the structure shown in Figures 1 and 2.

Secured to the rear face of back plate 14 by means of a pair of upper cap screws 21; a pair of lower cap screws 22; and a pair of intermediate screws 21a is a mounting or adapting plate 23 having a flange 24 adapted to seat in back plate 14, and a flange 25 adapted to seat in a coacting piloting bore in the turret of the machine with which the head is to be used. Plate 23 is also provided with a plurality of tapped openings 26 by which it is adapted to be secured to the turret (not shown).

The openings in plate A through which cap screws 21 and 22 project are sufficiently large so that when the cap screws are loosened the head may be moved laterally with respect to the axis of plate 23, and in order to provide for positive adjustment of the parts back plate 14 is provided at its bottom with a pair of lugs 27, each of which carries a set screw 28 adapted to be locked in place by a lock nut 29 coacting with an abutment surface 31 on the back plate. Accordingly, by loosening lock nut 29, and threading screws 28 inwardly, the head may be moved downwardly with respect to the plate 23. As will be noted from Figure 7 the clearance between flange 24 and back plate 14 adequately provides for adjustment of the adapter plate 23 to avoid the necessity of re-boring the turret.

In order to provide for definitely lifting the head with respect to the mounting plate, the back plate is provided with a flange 33 at the top of arcuate form, and cooperating with the inner face 34 thereof is a set screw 35 carried in an ear 36 in mounting plate 23 and adapted to be locked in place by a lock nut 37.

Sidewise movement of the head on the mounting plate is controlled by a pair of set screws 38 threaded into lugs 39 located at diametrically opposite points on back plate 14, and locked in place by lock nuts 42. Screws 38 cooperate directly with the periphery of the mounting plate as seen in Figure 8.

From the foregoing it is apparent that, by loosening screws 21, 21a and 22 and adjusting screws 28, 35 and 38, the head may be brought into the exact desired position with respect to the work axis, and that by tightening lock nuts 29, 37 and 42, and taking up nuts 21, 21a and 22, this relationship of the parts will be constantly maintained.

The receding mechanism is supported at the top of the head and comprises a body 45 having axially spaced surfaces 46 and 47 coacting respectively with surfaces 48 and 49 provided on front plate 11 and rear plate 14. The body is secured to a flange 51 on the front plate by means of cap screws 52. As seen in Figure 1, flange 51 is provided with a recess 53 opposite the top of guideway 12, providing sufficient clearance for the upper chaser and holder assembly to move outwardly to cut the greatest diametered work the device is capable of handling. Disposed against the flat rear face of body 45 is a closure plate 55, and (as seen in Figures 2 and 7) it is clamped between body 45 and flange 33 of back plate 14, the parts being secured in place by a plurality of screws 56 passing through openings in both the flange and the closure plate. Body 45 is rigidly secured to the back plate 14 by a plurality of screws 57. Body 45 is provided with a forwardly extending track portion 58 for guiding certain parts of the receding mechanism, which will be described in detail hereinafter.

*Chaser holder mounting assembly*

Figure 9:
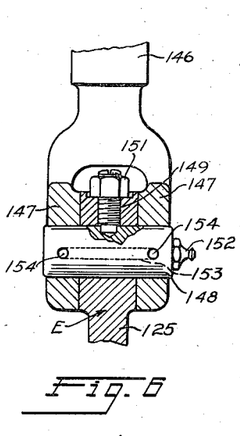
Figure 9 is a fragmental front elevational view of the head showing one of the chaser holder assemblies in place.
Figures 9, 11, 12:
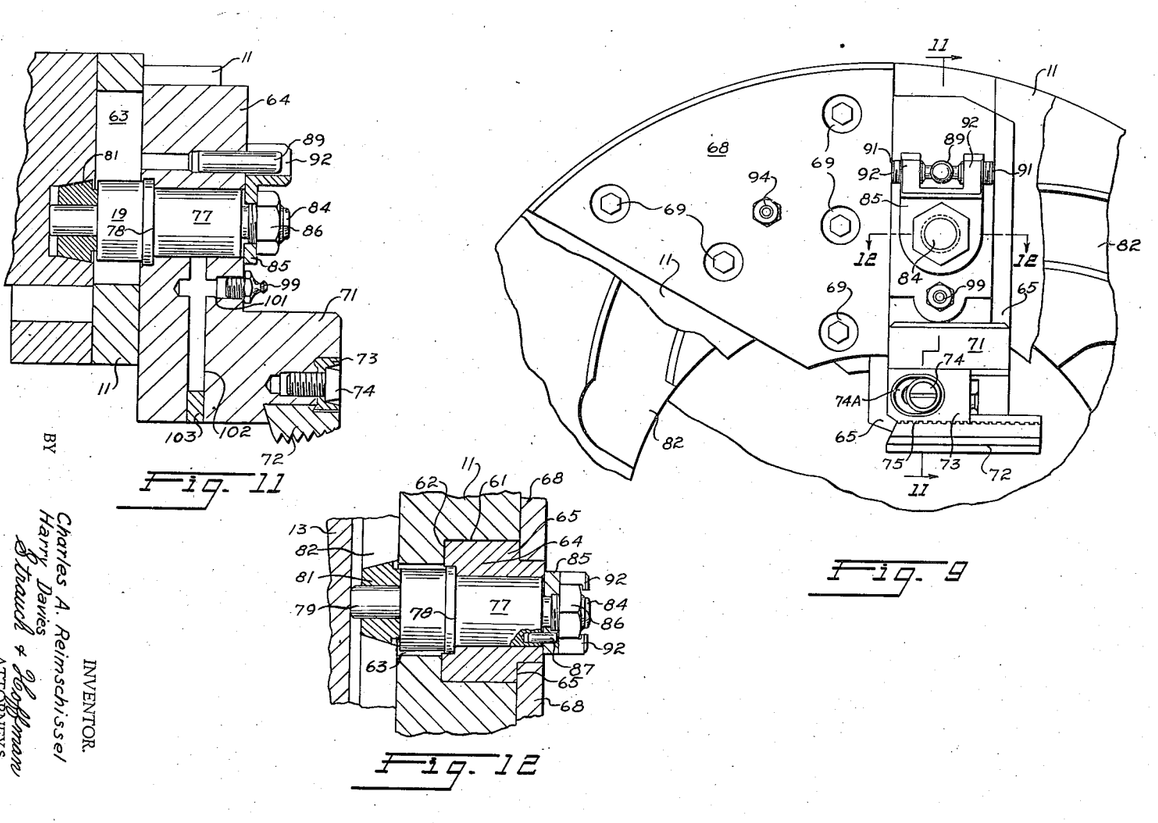
Figure 11 is a fragmental sectional view taken substantially and the line 11—11 of Figure 9, looking in the direction of the arrows.
Figure 12 is a fragmental sectional view substantially at right angles to Figure 11 and taken substantially on the line 12—12 of Figure 9.

Referring now to Figures 9, 11 and 12, each guideway 12 is made up of a pair of side walls 61, and a bottom wall 62, the latter being provided with elongated openings 63 through which the chaser actuating mechanism projects. Each chaser holder 64 is of rectangular cross section, having surfaces cooperating in snug sliding engagement with the side and bottom walls of the guideways, the upper portions of the holders being cut away along each side to provide surfaces 65 disposed parallel to the base of the holder and lying substantially in the plane of front face 66 of the front plate 11. Secured to plate 11 intermediate each pair of guideways 12, by means of cap screws 69, is a sector-shaped gib plate 68 and (as seen in Figure 12) the side edges overlap surfaces 65 of the holder so as to maintain the latter in their guideways and yet permit free inward and outward movement thereof.

We have found that, by mounting the chaser slides in the novel manner just described, the costly tongue and groove connections heretofore used are eliminated and it also makes it possible to take up any excessive clearances developing between the chaser slides and their guides incident to normal wear of the parts. Also, by locating the chaser slides at the front of the head, so as to extend a minimum distance from their points of support, the bending moment is materially lessened, and by controlling the chasers by a cam ring incorporated in the head behind the chasers the construction is materially simplified and the chaser slides are readily accessible from the front of the machine. This novel assembly also makes it possible to give the chasers a sufficiently great range of movement to thread extra large diametered work with a small head diameter, and also to adjust the eccentrically mounted rollers from the front of the device.

Each chaser slide is provided with an enlarged head 71, to which a tangential chaser 72 is secured by a chaser clamp 73 and a screw 74. As seen in Figure 9, the chaser and clamp are provided with interengaging serrations 75, so that by loosening screw 74 and moving the clamp along its guideways the chaser may be adjusted toward and away from the work through the limit of movement permitted by elongated opening 74a in the clamp, and a greater range of movement may be provided by removing and re-engaging the chaser with a different set of serrations on the clamp.

The foregoing chaser and clamp assembly is disclosed and claimed in United States Patent No. 2,239,735 issued April 29, 1941, for Thread cutting mechanism, which may be referred to for a detailed disclosure.

Snugly journalled in each holder is a trunnion 77 having a shoulder 78 adapted to be pulled up against a counter bore in the bottom of the holder. Trunnions 77 project through slots 63 in front plate 11 and each has an eccentric pin 79 carrying a frusto-conical roller 81. Rollers 81 cooperate with spiral cam grooves 82 in cam ring 17, the walls of the grooves being correspondingly tapered as seen in Figure 11, so as to cooperate in full surface engagement with the rollers.

Each trunnion has a reduced threaded front end 84 which is received in a lever 85. A nut 86 threaded on the trunnion pulls shoulder 78 into tight engagement with its counter bore, and tightly clamps lever 85 against the front face of the holder, and a pin 87 fitting in aligned openings in the trunnion and lever rigidly locks the two together for synchronous rocking movement.

Each lever 85 is adapted to be rigidly locked in any one of a plurality of adjusted positions by means of a pin 89 secured in the holder and cooperating with a pair of set screws 91 carried in fork-like extensions 92 of the lever.

From the foregoing it is apparent that by loosening nut 86 and adjusting the screws 91 the trunnions may be rotated to bring their eccentric ends and rollers 81 into the desired angular position, it being understood that by adjusting the rollers in this manner the holders will be moved inwardly or outwardly in their guides independently of the cam ring. This adjustment is used primarily in initially setting up the head, for the purpose of bringing all of the holders to a predetermined base diameter, to insure that when the chasers are subsequently actuated by the cam ring during the threading operation they will simultaneously move the same distance from the axis of the head, and will accordingly accurately cut a tapered thread. It should be observed that when shims are removed from beneath gib plates 68 to compensate for wear of the parts, this also results in rollers 81 being displaced axially in a direction to compensate for wear thereof, in view of their conical form.

We have also found that, by providing special lubrication means, the life of the chaser holders and their guides may be materially lengthened. To this end a lubricant fitting 94 is centrally secured in each gib plate 68 and communicates with a plurality of lubricant grooves 95, 96, 97 and 98 formed in the front face of front plate 11 (Figure 1) and the latter communicates with lubricant grooves 95a, 96a, 97a and 98a provided in the sides of guideways 12. Grooves 96a and 97a in turn communicate with lubricant grooves 96b and 97b provided in the bottom walls of the guideways. Accordingly, by introducing lubricant through fitting 94, it is conducted to the side walls of the guideways, and lubricant grooves 96b and 97b additionally conduct lubricant to the lower faces of the holder, it being understood that no corresponding lubricant grooves are provided at the ends of grooves 95a and 98a, inasmuch as lubricant introduced through such grooves would be largely lost through trunnion openings 63.

Efficient lubrication of each trunnion is provided by a lubricant fitting 99 communicating with a bore 101 and a cross bore 102 in the holder. Lubricant introduced through fitting 99 accordingly passes directly through bores 101 and 102 to the bearing surface of trunnion 77, the outer end of cross bore 102 being provided with a plug 103 to prevent escape of lubricant. The long bore provides a lubricant reservoir.

The lubricant supplied to the slide guideways and trunnions is a heavy grease forced under pressure by a charging gun through the fittings 94 and 99. By thus supplying a lubricating grease under pressure to all openings the entrance of fine scale and grit, carried in suspension by the cooling oil, into the chaser slides and trunnion bearings is precluded.

The invention accordingly provides novel chaser holder guiding and actuating assemblies which afford great strength with a minimum of bending moment and yet by locating the cam ring behind the front plate the chaser and chaser holders are constantly available for adjustment, and also this permits the holders to be removed from their guides when desired. The single chaser and holder assembly shown in Figure 9 is set for cutting a relatively small diametered piece of work, and it is to be understood that, if desired, the chasers may be adjusted outwardly in their guides to cut larger diametered work, the recess 53 in flange 51 permitting the top chaser holder assembly to be moved outwardly to cut the largest diametered work the machine is capable of handling.

Manual head opening structure

The invention also provides improvements in the manual head opening construction of the aforementioned Mathias patent that will now be described.

Referring more particularly to Figures 1 to 6, inclusive, cam ring 17 is provided with an integral ear or lug 104 located to one side of the device and having a parallel-walled slot 105. Journalled in opposite ends of lug 104 is an adjusting screw 106 which is adapted to be locked in adjusted position therein by a pair of lock nuts 107. Threaded on screw 106, and having a slide portion 108 providing flat sides disposed in snug sliding engagement with the walls of slot 105, is a trunnion 109. As seen more clearly in Figure 3, pin 109 is provided with a flange 111, which is adapted to be pulled into tight clamping engagement with the rear side of the lug by means of a nut 112 engaged on a threaded extension 113 of the trunnion, and bearing against a washer or thrust member 114, having a parallel-sided pilot portion 115 projecting into slot 105, but axially spaced from the end face of nut portion 108.

Accordingly, by loosening nut 112 and rotating screw 106 in one direction or the other, the trunnion may be caused to slide in one direction or the other in slot 105 and rock the cam ring into the angle necessary to effect the desired diametrical adjustment of the chaser holders in their guides.

Trunnion 109 is adapted to be either automatically or manually actuated, to rock the cam ring, in the manner that will now be set forth.

Figures 3, 4, 5, 17, 18:
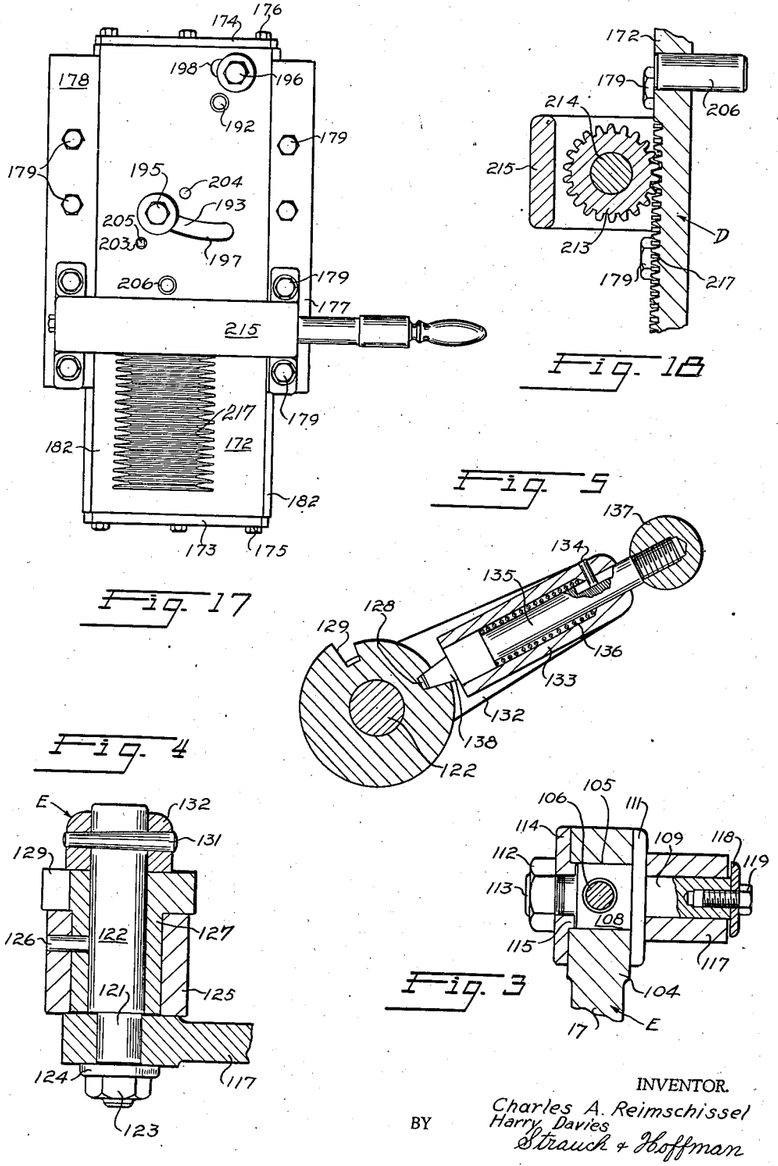
Figure 3 is a fragmental sectional view on the line 3—3 of Figure 1, looking in the direction of the arrows.
Figure 4 is a fragmental sectional view taken on the line 4—4 of Figure 1.
Figure 5 is a fragmental sectional view taken through the rough and finish lever assembly.
Figure 17 is a top plan view of the receding mechanism.
Figure 18 is a fragmental vertical sectional view taken substantially on the line 18—18 of Figure 1.

Freely journalled on the rear end of trunnion 109 is a link 117, secured in place by a washer 118 and a screw 119. Journalled in the free end of link 117 is the eccentric reduced end portion 121 of a shaft 122, being held in place by the nut 123 and a washer 124. Journalled on shaft 122 and secured to a hand lever 125, by means of a pin 126, is a flanged bushing 127, the flange being provided with a pair of radial notches 128 and 129. Secured to the end of shaft 122 by a pin 131 is a hand lever 132 carrying a barrel 133. Mounted for reciprocation in barrel 133, and restrained against rotation by a pin 134, is a plunger 135, which is resiliently urged toward the flange of member 127 by means of a spring 136 and is also provided with a hand knob 137. The inner end of the plunger is formed with a locking detent 138 adapted to be projected into either notch 128 or 129, to lock the shaft 122 in two different angular positions with respect to lever 125 and bushing 127. With detent 138 locked in recess 128 as shown in Figure 5, lever 132 lies behind lever 125, as shown in dotted lines in Figure 1. With lever 132 in the position just described, the parts are in normal thread cutting position, with the result that if the machine is then operated a tapered thread may be cut upon a workpiece in a single pass through the machine.

If, however, the knob 137 is pulled out against the action of spring 136, and lever 132 rocked counterclockwise to engage detent 138 in notch 129 of Figure 5, eccentric 121 is rotated so as to decrease the distance between the axis of shaft 122 and trunnion 109, thereby in effect shortening the link and rocking the cam ring 17 a slight distance in a counterclockwise direction to slightly open the head, and move the chaser holders outwardly a slight distance. Under these conditions the machine is in condition to cut a rough thread upon the work. The work is accordingly given one pass through the machine; lever 132 is then rocked into the position shown in Figure 5, so as to rock the cam ring clockwise into its final thread cutting position; and the work is again passed through the machine to cut the thread to final form. This method is followed when it is desired to cut an extremely accurate thread, it being understood that for general work the lever 132 will be retained in the position shown in Figure 5 and the work given but a single pass through the machine.

Rocking movement of lever 125 is limited by coacting stop lugs 141 and 142 provided on the lever coacting respectively with stop lugs 143 and 144 formed on link 117.

During the operations just described lever 125 is fulcrumed about its upper end as an axis, the reaction being taken by a curved rack bar 146, having a bifurcated lower end 147, journalled on a pin 148 secured in the upper end of lever 125 by means of a set screw 149 and a lock nut 151. Lubrication for the joints is provided by a lubricant fitting 152 communicating with a central bore 153 in pin 148, the latter in turn communicating with radial passages 154 leading to the bifurcated bearing portions in fork 147.

It will be noted that all of the manually operable parts of the cam adjusting means are located approximately at or below the axial center of the die head, at the front thereof, where they are conveniently accessible for operation by one attendant.

Rock bar 146 is normally maintained in fixed angular position when lever 125 is being manipulated to open the head, and is adapted to be automatically operated during normal threading operations to cause the chasers to recede or move outwardly and cut a tapered thread upon the work. The mechanism for effecting this automatic operation will now be described.

Figure 10:
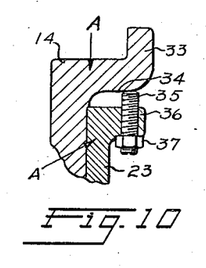
Figure 10 is a fragmental sectional view taken substantially on the line 10—10 of Figure 8.

Referring particularly to Figures 7, 8 and 10, it is observed that the rear mounting surface of receding head body 45 is of curved form and lies against the outer surface of flange 33 of the back plate 14 of the head, being rigidly secured thereto by cap screws 57.

Receding mechanism

Rack bar 146 is guided for endwise displacement about the axis of the head by means of the bottom wall 156 of a recess 157 formed in the body member and is restrained against movement longitudinally of the head axis by side wall 158 of recess 157 and by closure 55.

Upward displacement of the rack bar is limited by a pair of gibs 159 located in recess 157. The upper sides of gibs 159 also cooperate in guiding relationship with a straight rack bar 161, which has teeth meshing with the teeth of rack bar 146 and is also confined against lateral movement by the side wall 158 of recess 157 and by closure 55.

Adjustment of each gib to compensate for wear is effected by means of a bushing 162 having an eccentric portion 163 cooperating with an elongated slot 164 in each gib. The bushing is also provided with a hex head 165 for rotating it into the desired position. When the desired adjustment is secured it is locked in place by a cap screw 166 extending through the bushing and threaded into body 45, it being observed that the bushing is provided with a shank concentric with its bore and which snugly fits into an opening in closure plate 55.

Figures 13, 14, 15, 16:
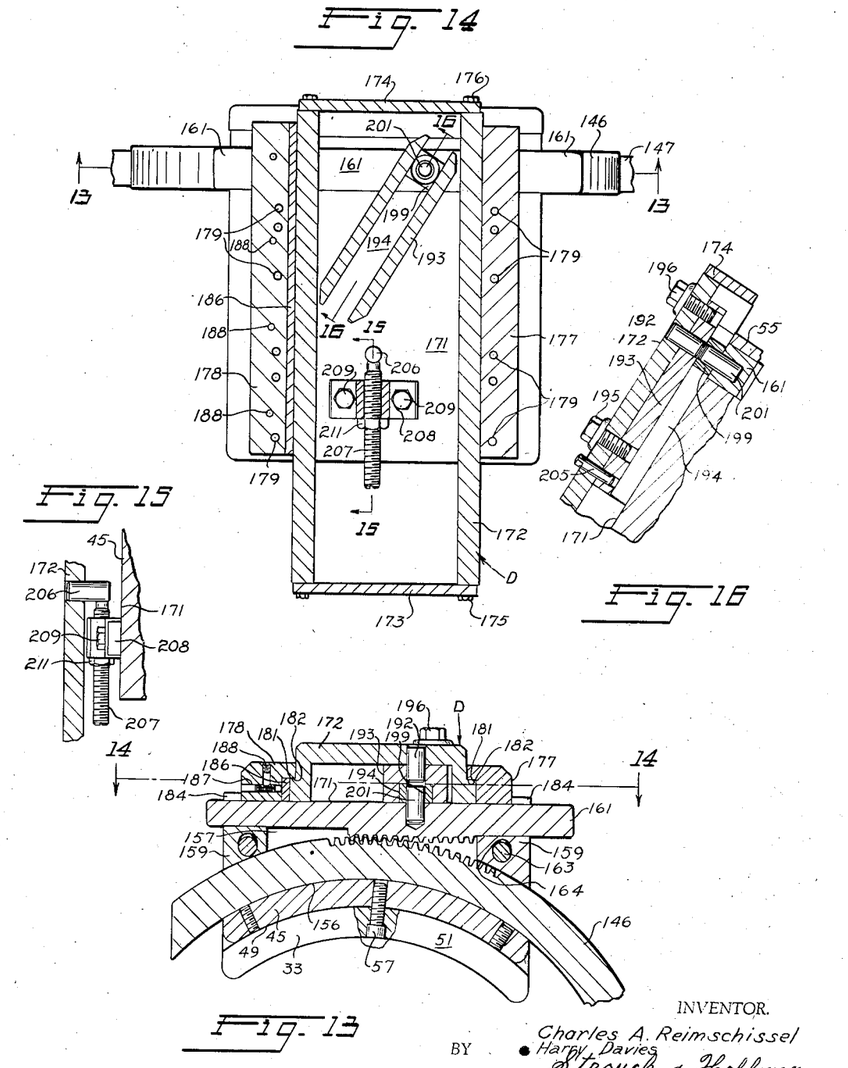
Figure 13 is a vertical sectional view taken substantially on the line 13—13 of Figure 14, illustrating the parts as they appear when the device is in thread-cutting condition.
Figure 14 is a horizontal sectional view taken substantially on the line 14—14 of Figure 13, looking in the direction of the arrows.
Figure 15 is a fragmental vertical sectional view taken substantially on the lines 15—15 of Figure 14.
Figure 16 is a vertical fragmental sectional view taken substantially on the line 16—16 of Figure 14.

Accordingly, by loosening screws 166 and rotating nut portions 165, the bushings may be rotated to displace gibs 159 to take up any lost motion between rack bars 146 and 161 and their respective guides, thereby insuring accuracy of the apparatus throughout its life. Mounted for longitudinal sliding movement at right angles to rack bar 161, on the flat upper surface of 171 of receding head body 45, is a slide 172 which is of inverted U-shape in cross section, as seen in Figure 13, and has front and rear end plates 173 and 174 respectively secured thereby by cap screws 175 and 176. Slide 172 is accurately guided for longitudinal movement and is restrained against upward displacement by means of a pair of gibs 177 and 178 secured to the body 45 by cap screws 179. The gibs have downwardly facing surfaces 181 which cooperate with upwardly facing surfaces 182 on the slide, to maintain it in snug sliding engagement with surface 171. The upper end of closure plate 55 lies substantially flush with upper surface 171 of body 45, except for a pair of lugs 184 which project upwardly a slight distance outside of the gibs.

Gib 178 is provided with a supplemental gib plate 186, backed up by set screws 187 and adapted to be locked in fixed position by locking set screws 188. Accordingly, by adjusting screws 187, parallelism of supplemental gib 186 with gib 177 may be accurately established and maintained throughout the life of the apparatus, with the proper degree of clearance to provide free sliding movement of the parts.

From the foregoing disclosure it is apparent that slide 172 is accurately guided for longitudinal sliding movement on the head and it is adapted to be shifted during the threading operation by bodily engagement with a stationary abutment 191, with the result that as the die head advances in the threading operation, slide 172 is moved toward the right or rearwardly in Figure 2. This rearward movement of the slide is utilized to retract the chasers in the manner that will now be described.

Pivotally mounted on the under side of slide 172 by means of a pin 192, and resting on surface 171, is a sine bar 193 having a downwardly directed channel 194. The sine bar is adapted to be frictionally locked in adjusted position by means of a pair of cap screws 195 and 196 passing through arcuate slots 197 and 198, respectively, in the top of slide 172 and threaded into the sine bar. Slidably cooperating with the sine bar channel is a flat sided slide member 199 which is journalled on a pin 201 carried by rack bar 161.

From the foregoing description it is apparent that longitudinal reciprocation of the sine bar upwardly in Figure 14 will result in member 199 undergoing a camming action to the left in Figure 14 carrying rack bars 161 and 146 in the same direction. Referring now to Figure 1, it is apparent that displacement of bar 146 to the left, or in a counterclockwise direction will result in bodily shifting lever 125, link 117, ear 104 and cam ring 17 bodily in a counterclockwise direction which (referring to Figure 9) results in moving the chaser holders simultaneously outwardly, thereby causing them to cut a tapered thread, the degree of taper depending upon the inclination of sine bar 193 with respect to the longitudinal axis of the head.

By loosening screws 195 and 196, the sine bar may be rocked about the axis of pin 192 to vary the inclination of the sine bar and hence the taper, and in order to facilitate adjustments of taper we have provided the plurality of openings 203 and 204 in slide 172 aligning with similar openings in the sine bar and into which a pin 205 may be selectively inserted. We have shown only two openings, for the most commonly used degrees of taper, but it is to be understood that, if desired, additional openings may be provided in the slide and sine bar to take care of further often used tapers.

It should be particularly observed, referring to Figures 14 and 16, that when the parts are in threading position pins 192 and 201 are disposed in exact axial alignment, with the result that, when the sine bar is rocked about the axis of pin 192 for the purpose of varying the taper, member 199 will merely idly rotate about pin 201 without transmitting lateral displacement forces to rack bar 161. The device accordingly may be adjusted for any desired angle of taper without disturbing the diametrical setting of the head, because no movement of the chasers is effected during adjustment of the sine bar. It should also be observed that slots 197 and 198 are of sufficient length so that the sine bar may be adjusted into exact parallelism with the longitudinal axis of the head, with the result that when the sine bar is in this position slide 172 may be displaced throughout its range of movement without effecting movement of rack bar 161. The device is accordingly readily adjustable so as to cut various tapered threads as well as non-tapered threads, which materially increases the scope of usefulness of the apparatus.

The slide is adapted to be accurately stopped in the foregoing thread cutting position, with the axis of pins 192 and 201 axially aligned, by means of a stop pin 206 secured in slide 172 cooperating with a stop screw 207 threaded into a bracket 208 secured to body 45 by means of cap screws 209. By adjusting screw 207, the threading position of slide 172 may be accurately determined, and it is adapted to be locked in place by a lock nut 211.

Upon conclusion of the threading operation the slide is adapted to be brought back to starting position by any desired manual or power operated means, and retraction of the slide in this manner simultaneously retracts rack bars 161 and 146, rocking lever 125 and link 117, together with cam ring 17 clockwise into the position shown in Figure 1. A preferred form of manual retraction means is illustrated in Figures 1, 17 and 18 and embodies a pinion 213 carried by a shaft 214 journalled in a yoke 215. The yoke is secured to gibs 177 and 178 by four of the screws employed to hold the gibs in place. Shaft 214 is adapted to be actuated by a crank 216. Pinion 213 meshes with rack teeth 217, preferably integrally formed in the upper surface of slide 172.

From the foregoing disclosure it is apparent that, by rotating shaft 214 clockwise, slide 172 will be shifted from right to left, until stop pin 206 contacts stop screw 207, when it will be disposed exactly in threading position.

*Operation*

Assuming that the head is secured to a turret by means of the mounting plate 23, and has been adjusted into proper position on the mounting plate with respect to the axis of the work by the various adjusting screw assemblies, the machine is placed in operation by gripping the work in a chuck or other holder in well known manner (not shown), and is simultaneously rotated and advanced toward the head. Abutment 191 is also moved toward the head simultaneously with the work, and as the work is engaged and threaded by chasers 72, the abutment strikes the front end of slide 172, causing it to travel from left to right in Figure 2. The point in the travel of the work at which abutment 191 will contact the slide is adjustable in well known manner (not shown) to suit the particular threading job at hand. As previously pointed out, rearward travel of slide 172 causes the sine bar 193 to effect movement of rack bars 161 and 146 from right to left or counterclockwise in Figure 1, and this action, through the intermediary of lever 125 and link 117 (which in the position shown in Figure 1 function as a rigid link) causes cam ring 17 to rock counterclockwise in Figure 1, and 11 and effect outward travel of the chasers and generate a tapered thread.

At the conclusion of the foregoing threading operation, handle 125 is grasped and rocked counterclockwise (Figure 1) which gives the cam ring an additional angular counterclockwise rotation, due to lever 125 fulcruming on pin 148, causing the chasers to move outwardly sufficiently to disengage them from the thread formed on the work. This operation may also be employed to stop the threading operation at any other desired time.

At the conclusion of the threading operation the work is withdrawn from the dies and the head is retracted or restored to threading condition by rocking lever 125 back into the position shown in Figure 1 and rotating crank 216 clockwise (in Figure 2) to cause slide 172 to travel forwardly into position shown in Figure 2. This retraction of slide 172, just described, causes the sine bar to effect movement of rack bars 161 and 146 to the right or clockwise into the position shown in Figure 1, the apparatus now being in condition for the threading of a further work piece.

If at any time it is desired to increase or decrease the diametrical size of the head, nut 112 is loosened and screw 106 rotated to rock the cam ring to effect either inward or outward movement of the holders in their guides, as the case may be. After the desired adjustment has been secured, nut 112 is tightened to lock the parts in place.

When it is desired to change the degree of taper of the thread cut on the work, sine bar 193 is rocked about pin 192 and locked in place, the top of the slide preferably being provided with indicia cooperating with bolt 195 designating the degrees of taper, and as previously pointed out pin 205 may be used to secure the most commonly employed taper.

From the foregoing detailed disclosure of the invention, it is apparent that we have provided a die head assembly capable of rapidly and economically forming very precise tapered or non-tapered threads on relatively large diameter pipe fittings; which is of such compact design that it may be readily incorporated in turret type machines; the head is so designed that chaser holders are constantly accessible; the receding mechanism is of novel form and is disposed at the top of the head, where it consumes a minimum of space; novel holder and holder adjusting assemblies are provided; a sine bar is provided with a novel assembly of parts whereby adjustment of the degree of taper may be carried out without disturbing the diametrical adjustment of the chasers; a novel mounting assembly is provided which enables the die head to be accurately aligned with the axis of the work; and a thoroughly practical, rugged die head of simple yet rugged and efficient design is achieved.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a thread cutting mechanism, a head body rigidly carrying a front plate member having guideway means in its front face; a plurality of thread cutting assemblies mounted in said guideway means for inward and outward movement; actuating means on each assembly projecting rearwardly through an opening in said plate member; a cam member, disposed rearwardly of said plate, mounted for rocking movement about the axis of the head body and coacting with said actuating means for effecting simultaneous movement of said thread cutting assemblies along said guideway means when it is rocked and means detachably retaining each cutting assembly in assembled relation with its actuating means, whereby said assemblies may be individually displaced with respect to said actuating means axially of the head body and removed from said guideway means.

2. In a thread cutting mechanism, a head body having a front plate provided with forwardly opening guideways; a thread cutting device mounted in each guideway, means detachably secured to the front face of said plate to removably retain said devices in the guideways, said head including a rear plate, a cam ring mounted between said front and rear plates for rocking movement about the axis of said head body; and means for causing said cam ring to effect simultaneous sliding movement of said thread cutting devices when it is rocked.

3. In a thread cutting mechanism, a head body, a member on said body having a guideway, said guideway comprising a pair of transversely parallel side walls opening onto the front face of said member; a thread cutting device having a slide seated in said guideway, said slide having a cut away portion in each of its longitudinal edges to provide an edge surface disposed substantially in the plane of the front face of said member; a gib plate disposed on each side of said guideway and seating in sliding engagement with one of said edge surfaces of said slide; and means for detachably securing said gib plates to said member to removably retain the slide in said guideway.

4. In a thread cutting mechanism, a head body; a front member on said body having a plurality of slides mounted for inward and outward sliding movement thereon; a plate mounted behind said front member for rocking movement about the axis of said head body and having a plurality of cam grooves; roller means on said slides coacting with said cam grooves and operable to move said slides inwardly and outwardly when said plate is rocked, said cam grooves having walls which diverge toward said front member and said roller means comprises rollers so tapered to lie in full surface engagement with the walls of said cam grooves; and means for adjusting said rollers axially, to take up lost-motion between them and said cam walls.

5. In a thread cutting mechanism, a head body having a guideway on its front face; a cam ring mounted for rocking movement about the axis of said head body; a slide member mounted for sliding movement in said guideway; a trunnion journalled in said slide member and having an eccentrically mounted roller coacting with said cam ring; and means for locking said trunnion in predetermined angular position with respect to said slide member, comprising an arm secured to said trunnion and overlying the front face of said slide member; means on said arm and slide member for anchoring the arm in a plurality of adjusted positions and means for mounting a thread cutting element on said slide member.

6. In a thread cutting mechanism, a head body having an outwardly extending guideway; a slide mounted in said guideway; a gib plate secured to said head body either side of said slide and operable to retain the latter in said guideway; lubricant receiving grooves formed in said head body intermediate said guideways and closed by said gib plates, said grooves communicating with grooves in the side walls of said guideways; and means on said gibs for retaining a lubricating grease under pressure within said grooves.

7. The thread cutting mechanism defined in claim 6, wherein a trunnion is journalled in said slide and lubricant ducts are provided in said slide for supplying lubricant to said trunnions.

8. In a thread cutting mechanism, a head body having a plurality of thread cutters operably mounted thereon; a shank on said head body; and means for adjusting said shank and head body relatively in a plurality of directions in a plane disposed normal to the axis of said head body, for accurately centering said thread cutters with respect to the work to be threaded.

9. In a thread cutting mechanism, a head body having a plurality of movable thread cutters; a rockable cam for controlling said cutters; an actuating mechanism for said cam, comprising a slotted ear on said cam; a reciprocable bar mounted adjacent said ear; and a collapsible, adjustable length linkage operably interconnecting said ear and bar, for causing said bar to rock said cam when it is reciprocated, said linkage comprising a pivot member mounted for sliding movement on said ear parallel to said slot; means positively adjusting said member along said slot; means for locking said member in adjusted position on said ear; a pair of pivotally interconnected elements respectively connected to said pivot member and said reciprocable bar, and means for adjustably connecting said elements in predetermined angular relation to each other.

10. The thread cutting mechanism defined in claim 9, wherein said pivot member is guided by the walls of said slot and said adjusting means comprises a screw journalled in said slot and threadedly engaging said member.

11. The thread cutting mechanism defined in claim 9, wherein said pivot member comprises a nut portion disposed in said slot and threadedly engaging a screw; a journal portion disposed to one side of said ear; and a threaded portion extending to the opposite side of said ear and having a nut threaded thereon and frictionally locking said member to said ear.

12. In a thread cutting mechanism, a head having a plurality of cutters mounted for inward and outward movement and controlled by a rockable cam; means for rocking said cam during thread cutting to cause said cutters to produce a tapered thread, comprising a member movable in accordance with the threading operation; a lever pivoted to said member; a link pivotally connecting said lever and said cam ring, said link and said lever normally being disposed in such relationship that displacement of said member is reflected as a proportional angular displacement of said cam, and means for rocking said cam by minor amounts independently of said lever and member, comprising a trunnion journalled in said link and said lever and having eccentric and concentric bearing portions; and means for rocking said trunnion through a predetermined angle about the axis of said concentric bearing portion, for displacing the pivotal axis of connection between said link and said lever.

13. The thread cutting mechanism defined in claim 12, wherein the concentric and eccentric bearing portions of said trunnion are journalled in said lever and said link respectively and said means for rocking said trunnion comprises an arm carried by said concentric portion of said trunnion and having means for locking it in a plurality of adjusted positions with respect to said lever.

14. In a thread cutting mechanism, a head body nonrotatably supported in cooperative relationship to the work to be threaded and having a plurality of cutters mounted for inward and outward movement; a rockable cam for controlling said cutters; a cam actuator assembly mounted at the top of said head and comprising a curved rack bar mounted for reciprocation about the axis of said head and operably connected to said cam by means including manually operable cam adjusting means located at one side of the head and adjacent a horizontal plane intersecting the axis thereof, said cam actuator assembly also comprising a straight rack bar meshing with said curved rack bar and operably connected thereto; and means for reciprocating said straight rack bar in accordance with the threading operation, for causing said cutters to generate a tapered thread.

15. The thread cutting mechanism defined in claim 14, wherein said last named means comprises an open bottomed casing mounted for reciprocation in said actuator assembly substantially at right angles to said straight rack bar; a sine bar in said casing and inclined with respect to the axis of said head; and means on said straight rack bar constantly engaging said sine bar in all shifted positions thereof.

16. In a thread cutting mechanism, a head having a plurality of thread cutters movable from an operative thread cutting position to an inoperative work releasing position; a cam ring mounted for rocking movement about the axis of said head and coacting with said thread cutters to move them to and from operative and inoperative positions; means for automatically causing said cutters to move during thread cutting and generate a tapered thread, comprising a reciprocable member operably connected to said cam ring; a reciprocable carriage carrying a sine bar disposed at an inclination to the direction of reciprocation of said member and said carriage; pivotal means carried by said reciprocable member and slidably coacting with said sine bar to reciprocate said member and rock said cam ring when said carriage is reciprocated, said sine bar being mounted for rocking movement on said carriage into various adjusted degrees of inclination, for varying the degree of taper of the thread, the axis of said pivotal means being directly aligned with the axis of rocking movement of said sine bar when the latter and said reciprocable member are so disposed in operative position, whereby said sine bar may be adjusted to vary the amount of taper without disturbing the positions of said cutters.

17. The thread cutting mechanism defined in claim 16, wherein said sine bar is also adjustable into a position exactly parallel to the direction of travel of said carriage, whereby the cam ring will remain in fixed position during thread cutting and said cutters will be maintained at fixed radial distances from the head axis and generate a nontapered thread.

18. The thread cutting mechanism defined in claim 16, wherein means are provided acting directly upon said carriage for returning said sine bar and carriage to cutting position at the conclusion of the threading operation; and adjustable stop means are provided, coacting with said carriage for accurately arresting said carriage in cutting position with the axis of said pivotal means accurately aligned with the axis of rocking movement of said sine bar.

19. In a thread cutting mechanism, a head having a plurality of thread cutters mounted for movement from an operative thread-cutting position to an inoperative work-releasing position; a cam ring rockable on said head and operable to control the positions of said thread cutters; an upwardly directed flange on said head; a casing structure mounted on said head and having a curved rack bar mounted for reciprocation about the axis of said head; a straight rack bar meshing with said curved rack bar; a closure secured over said casing and confining said rack bars within said casing; and gib means carried by said casing for taking up play in said rack bars; and means on said closure for adjusting said gib means.

20. The thread cutting mechanism defined in claim 19, wherein said closure is frictionally gripped between said casing and said flange.

21. In a machine tool having a die head provided with a rockable die adjusting cam, operating means for said cam comprising a lever, a link pivotally connecting said lever intermediate of its ends with the cam, said connection including a pivot pin for one end of the link, and a manually adjustable member carried by the cam and having a threaded connection with said pivot pin to rock the cam relative to said lever and link and diametrically adjust the dies with respect to the die head.

22. In a machine tool having a die head provided with a rockable die adjusting cam, operating means for said cam comprising a lever, a link pivotally connecting said lever intermediate of its ends with the cam, said connection including a pivot pin for one end of the link, a manually adjustable member carried by the cam and having a threaded connection with said pivot pin to rock the cam relative to said lever and link and diametrically adjust the dies with respect to the die head, and means operatively connected to one end of said lever and automatically actuated during the work forming operation to transmit rocking motion to the cam through said lever and link and progressively adjust the position of the dies with respect to the work.

23. The combination defined in claim 22 in which said lever is manually operable relative to the last-named means, and the connection between said link and the lever comprises manually adjustable means to shift said link to a selected angular position relative to the lever and rock the cam to dispose the dies in a desired initial position relative to the work.

24. The combination defined in claim 22 in which said lever is manually operable relative to the last-named means, and the connection between said link and the lever comprises manually adjustable means to shift said link to a selected angular position relative to the lever and rock the cam to dispose the dies in a desired initial position relative to the work, together with means associated with said adjustable means to lock said link in its adjusted position.

25. In a machine tool having a die head provided with a rockable die adjusting cam, manually operable means for adjusting said cam comprising a lever pivotally supported at one of its ends at one side of the die head and having an operating handle extending therefrom below the axial center of the die head, a link pivotally connected at one of its ends to said lever adjacent to the upper pivoted end thereof, means adjustably connecting the cam below its axial center with the other end of said link, and means limiting rocking motion of the cam in each direction in the operation of said lever.

26. In a thread cutting machine having a plurality of movable thread cutters and cam means for progressively adjusting said cutters during the threading operation to generate a tapered thread on the work, an actuating member operatively connected with said cam means, and means controlling the operation of said actuating member in the thread cutting operation, comprising a reciprocable carriage, a sine bar, means pivotally connecting said bar at one of its ends to the carriage for angular adjustment transversely of the path of movement of said carriage, means for securing said sine bar in adjusted positon relative to the carriage, and a pivotal connection between said sine bar and actuating member slidably coacting with one of said parts in the reciprocatory movement of said carriage.

27. The combination defined in claim 26 in which the pivotal connections between the sine bar and the actuating member and carriage are disposed in axially coinciding relation in one position of the carriage to permit angular adjustment of the sine bar to vary the taper, without operating said cam actuating member.

28. The combination defined in claim 26, with means for securing the sine bar to the carriage in definite position relative to the path of movement of said carriage to render the coacting engagement of the sine bar with its pivotal connection to the actuating member ineffective to operate the latter, whereby the cutters are maintained in fixed position in the movement of the carriage, to generate a non-tapered thread.

CHARLES A. REIMSCHISSEL.
HARRY DAVIES.